(12) United States Patent
Bostock (10) Patent No.: US 9,703,889 B2
(45) Date of Patent: Jul. 11, 2017

(54) PROVIDING AUTO-FOCUS FOR A SEARCH FIELD IN A USER INTERFACE

(75) Inventor: Michael C. Bostock, San Francisco, CA (US)

(73) Assignee: Google Inc., Mountain View, CA (US)

( * ) Notice: Subject to any disclaimer, the term of this patent is extended or adjusted under 35 U.S.C. 154(b) by 383 days.

(21) Appl. No.: 11/706,104

(22) Filed: Feb. 14, 2007

(65) Prior Publication Data

US 2008/0195960 A1 Aug. 14, 2008

(51) Int. Cl.
*G06F 7/00* (2006.01)
*G06F 17/30* (2006.01)

(52) U.S. Cl.
CPC .. *G06F 17/30899* (2013.01); *G06F 17/30973* (2013.01)

(58) Field of Classification Search
CPC .................................................. G06F 17/30973
USPC ................................................ 707/102, 706
See application file for complete search history.

(56) References Cited

U.S. PATENT DOCUMENTS

| 5,745,099 | A | 4/1998 | Blomqvist | |
|---|---|---|---|---|
| 5,920,304 | A | 7/1999 | Berstis | |
| 6,005,550 | A | 12/1999 | Vaughan et al. | |
| 6,014,140 | A | 1/2000 | Strand | |
| 2003/0197744 | A1* | 10/2003 | Irvine | 345/856 |
| 2004/0160419 | A1* | 8/2004 | Padgitt | 345/173 |
| 2005/0060343 | A1* | 3/2005 | Gottsman et al. | 707/102 |
| 2006/0218503 | A1* | 9/2006 | Matthews et al. | 715/779 |

FOREIGN PATENT DOCUMENTS

| JP | 05011970 A | 1/1993 |
|---|---|---|
| JP | 2003330594 A | 11/2003 |

* cited by examiner

*Primary Examiner* — Ajith Jacob
(74) *Attorney, Agent, or Firm* — Fish & Richardson P.C.

(57) ABSTRACT

One embodiment of the present invention provides a system that provides auto-focus for a search field in a user interface, where the focus of the user interface specifies where in the user interface user input will be directed. During operation, the system receives an input from a user. The system then determines from characteristics of the input whether the input is directed to a search field in the user interface. If so, and if the focus is not already on the search field, the system automatically moves the focus of the user interface to the search field. Hence, the system can automatically direct the input and subsequent input to the search field without the user having to explicitly navigate to the search field.

18 Claims, 6 Drawing Sheets

PROVIDING AUTO-FOCUS FOR A SEARCH FIELD IN A USER INTERFACE

BACKGROUND

1. Field of the Invention

The present invention relates to user-interfaces for computer systems. More specifically, the present invention relates to a method for automatically directing user input to a search field in a user interface.

2. Related Art

The relentless growth of the Internet has been largely fueled by the development of sophisticated search engines, which enable users to comb through billions of web pages looking for specific pages of interest. A user can enter one or more search terms, and receive millions of search results. Due to the amount of data involved, a search by a user typically involves an iterative process in which the user adjusts and refines the search terms to find a desired set of search results.

During this search refinement process, the "focus" of the user interface can change one or more times. The focus of the user interface is the portion of the user interface set to receive user input. For instance, when the user selects a search field in a web page (e.g., via a mouse click) and then enters a search term into the search field by pressing keys on an input device, the search field receiving the input has the focus of the user interface. Later, for instance when the user highlights a result in a list of results returned in response to a search query, the focus of the user interface shifts to the page-level, and further inputs are directed to the page-level instead of to the search field. For example, when the focus is on the page-level of a web page and a user presses an arrow key, page-level navigational actions may be performed as a result of the key press.

The search refinement process typically involves entering a set of search terms into a search field, browsing through a list of search results, and then possibly modifying the search terms and initiating a refined search. Because the search field may no longer be visible in the user-interface context after the user has browsed through the list of search results, and the focus of the user interface may have changed, the user typically will need to perform a number of user-interface actions to modify the search terms and initiate a subsequent refined search. These navigational actions take time to perform and delay the search process.

Hence, what is needed is a method and an apparatus that allows users to modify search terms without the problems of the above-described techniques.

SUMMARY

One embodiment of the present invention provides a system that provides auto-focus for a search field in a user interface, where the focus of the user interface specifies where in the user interface user input will be directed. During operation, the system receives an input from a user. The system then determines from characteristics of the input whether the input is directed to a search field in the user interface. If so, and if the focus is not already on the search field, the system automatically moves the focus of the user interface to the search field. Hence, the system can automatically direct the input and subsequent input to the search field without the user having to explicitly navigate to the search field.

In a variation on this embodiment, the system identifies a subset of key press events that are likely to be directed to the search field. If an input is in this likely subset of key press events, the system determines that the input should be directed to the search field.

In a further variation, the subset of key press events includes: alphabetic characters; numeric characters; and/or punctuation characters.

In a variation on this embodiment, the system identifies a subset of key press events that are unlikely to be directed to the search field. If an input is not in this unlikely subset of key press events, the system determines that the input should be directed to the search field.

In a variation on this embodiment, the search field is the primary input field in the user interface.

In a variation on this embodiment, the search field is in the only input field in the user interface.

In a variation on this embodiment, directing an input to the search field can involve either appending the input to a string already present in the search field or resetting the contents of the search field to begin a new string.

In a variation on this embodiment, the user interface is a web page.

In a variation on this embodiment, the user interface is a user interface for a search engine, and the search field is a field in which a user enters queries for the search engine.

In a variation on this embodiment, the search field is always visible in the user interface.

In a variation on this embodiment, if the search field is not visible in the user interface, the system displays the search field in the visible area of the user interface when the system directs the focus of the user interface to the search field.

In a further variation, the system displays the search field in the visible area of the user interface by displaying the search field in the current context of the user interface or by performing a scrolling operation to display a context of the user interface that includes the search field.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Crawling Ranking and Searching Processes

Figure 1:
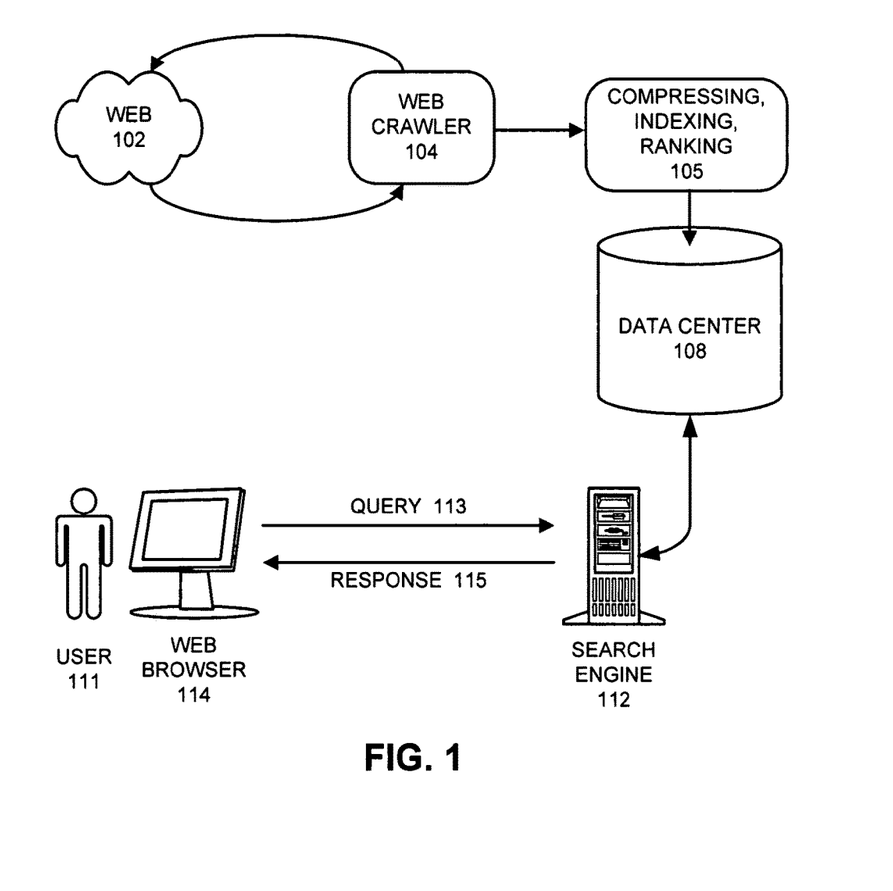
FIG. 1 illustrates the crawling, ranking and searching processes in accordance with an embodiment of the present invention.

FIG. 1 illustrates the crawling, ranking and searching processes. During the crawling process, a web crawler 104 crawls or otherwise searches through websites on web 102 to select web pages to be stored in indexed form in data center 108. The selected web pages are then compressed, indexed and ranked in module 105 before being stored in data center 108.

During a subsequent search process, a search engine 112 receives a query 113 from a user 111 through a web browser 114. This query 113 specifies a number of terms to be searched for in the set of documents. In response to query 113, search engine 112 uses search terms specified in the query to identify highly-ranked documents that satisfy the query. Search engine 112 then returns a response 115 through web browser 114, wherein the response 115 includes matching pages along with ranking information and references to the identified documents.

Entering Queries and Viewing Search Results

Figure 2A:
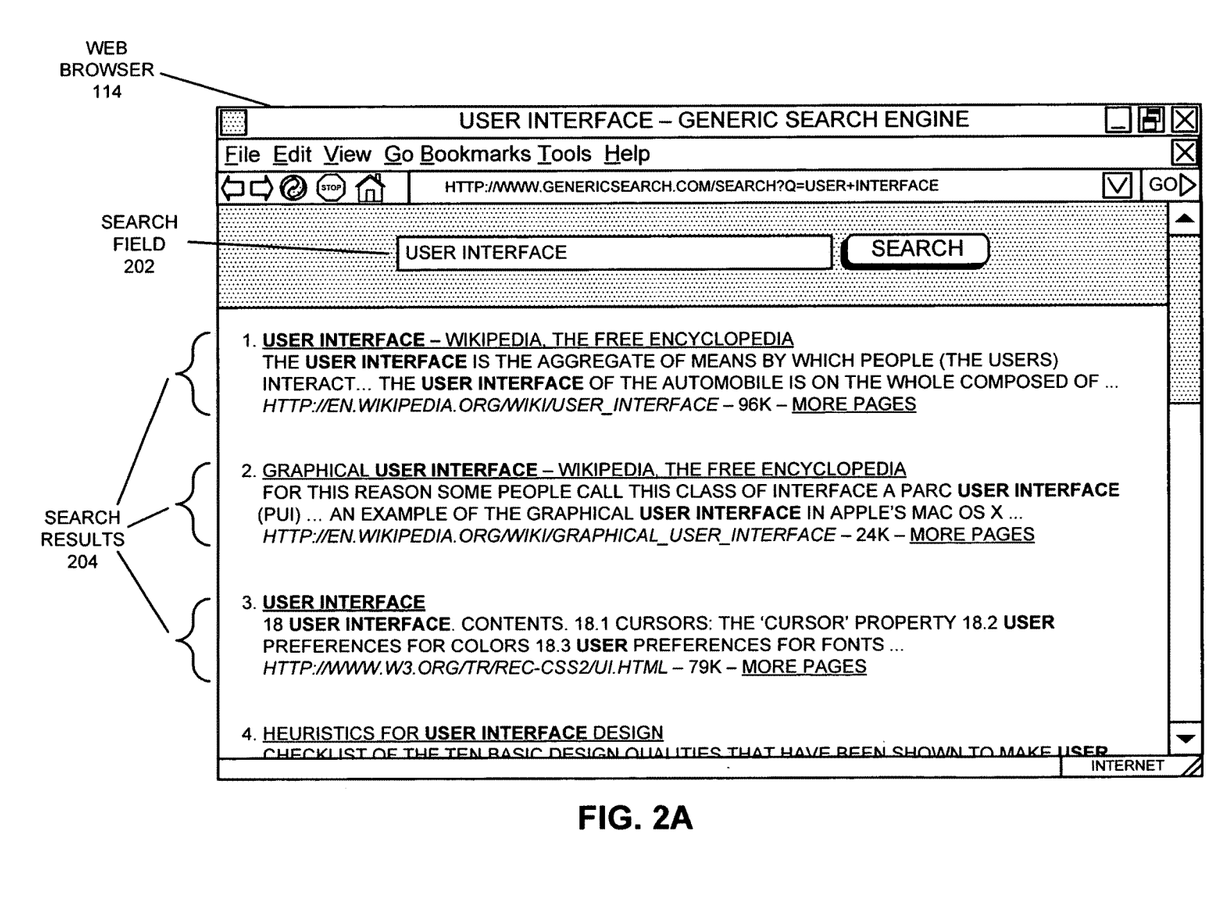
FIG. 2A illustrates a web page that displays a search field and search results in accordance with an embodiment of the present invention.

FIG. 2A illustrates a web page that displays a search field 202 and search results 204 in web browser 114. After a user 111 enters one or more search terms into search field 202 (e.g. suppose the user enters the query "user interface"), the system performs a search operation and displays the list of search results 204 for the query. The user 111 can then browse through the search results 204 to determine whether they include the desired information.

Note that the search field 202 typically does not have focus while the user 111 is browsing through the search results 204, because keeping the focus on the search field 202 while browsing could interfere with navigational input, such as key press events for navigational keys including the page up, page down, arrow, backspace, and space bar keys. As a result, the system typically sets the focus for newly-opened web pages to page-level focus by default. Hence, to enter search terms in the search field 202, the user 111 typically needs to change the focus of the user interface to specify that user input will be directed to the search field 202. For instance, the user 111 can focus on the search field 202 by clicking on the search field 202 with a pointing device such as a mouse.

Figure 3A:
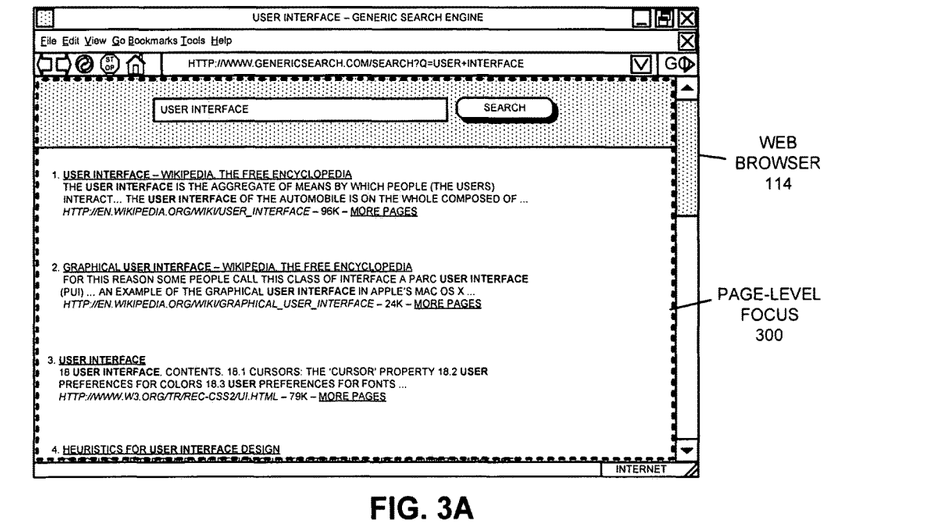
FIG. 3A illustrates page-level focus for a web page displaying search results in accordance with an embodiment of the present invention.

FIG. 3A illustrates page-level focus 300 for a web page displaying search results 204. With page-level focus 300, the system typically construes user input as being navigational.

Figure 3B:
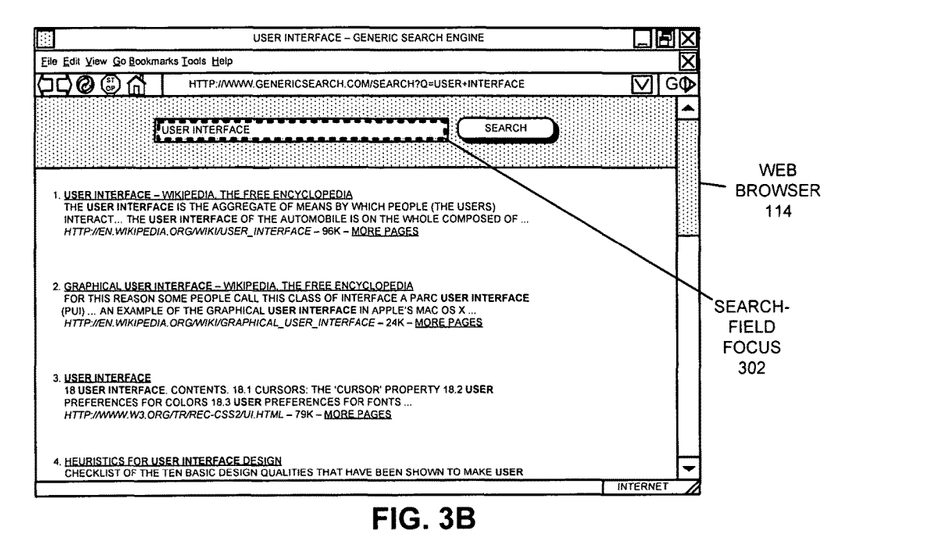
FIG. 3B illustrates search-field focus for a web page displaying search results in accordance with an embodiment of the present invention.

FIG. 3B illustrates search-field focus 302 for a web page displaying search results 204. With search-field focus 302, the system directs user input to the search field 202.

Figure 2B:
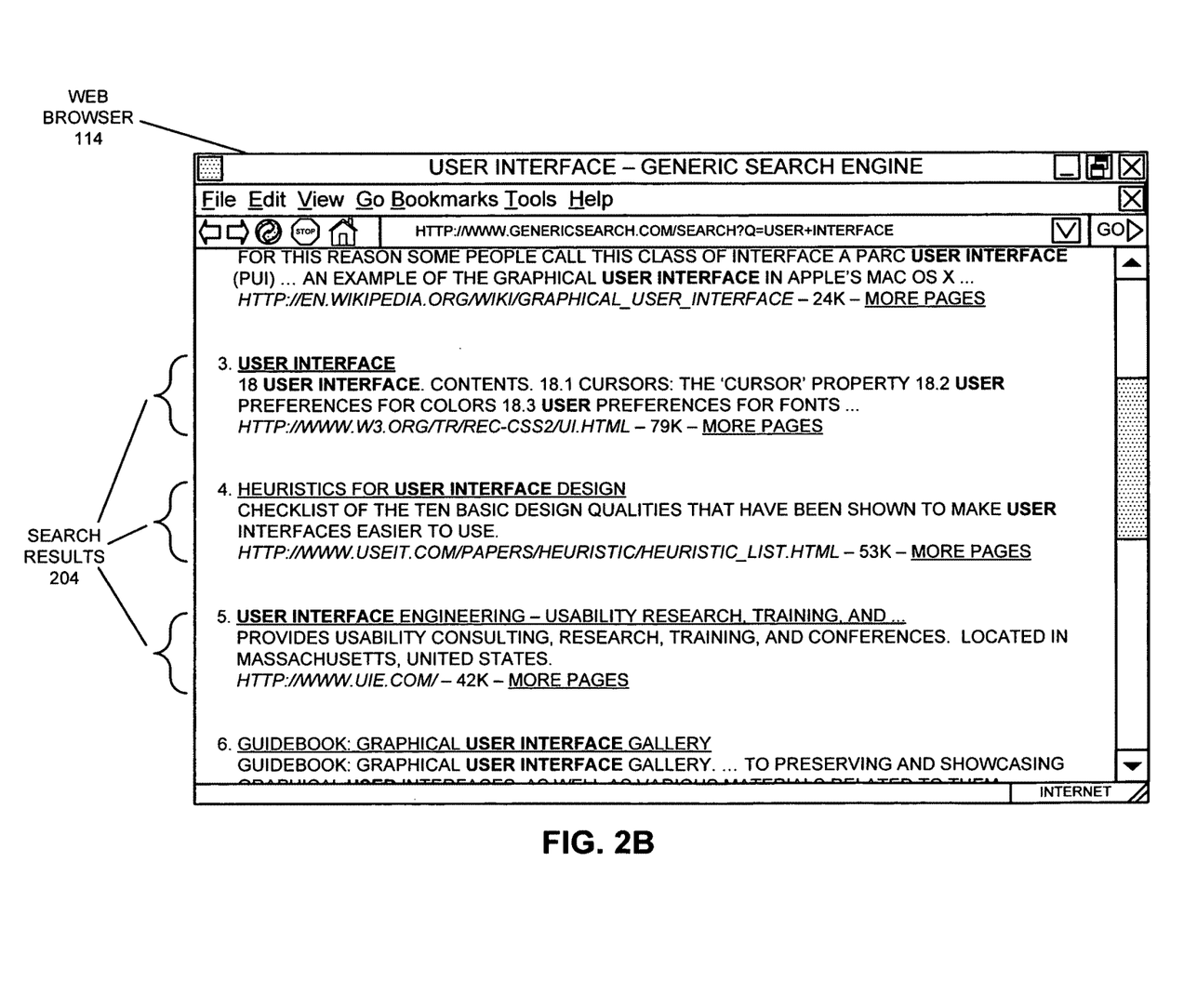
FIG. 2B illustrates a scrolled web page that displays search results in accordance with an embodiment of the present invention.

FIG. 2B illustrates a web page of search results 204 that has been scrolled down by a user 111. Note that because the user 111 has scrolled down the page, search field 202 is no longer visible. Consequently, if the user 111 determines that the search terms are too general and wants to modify the search terms, the user 111 typically needs to: (1) scroll back up in the page; (2) click on the search field 202 to set the focus on the search field 202; (3) delete the existing search terms; and then (4) type in new search terms.

In one embodiment of the present invention, the system reduces the number of user actions needed to modify a query by automatically directing user input that is related to the query to the search field 202, thereby saving the user 111 from having to explicitly navigate to, and set the focus on, the search field 202. The system determines from characteristics of the input whether or not the input is directed to the search field 202. If so, the system automatically sets the focus of the user interface to the search field 202, and then directs the user input and subsequent user input to the search field 202. Hence, the system allows users to quickly and easily refine queries to receive additional search results 204.

Figure 4:
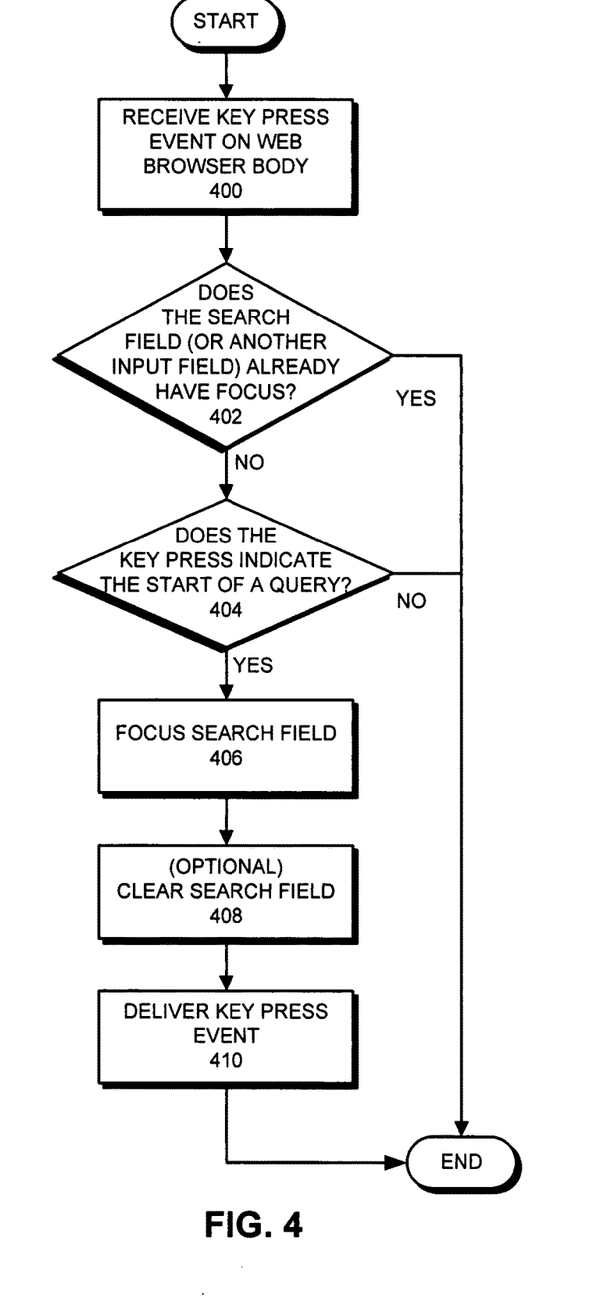
FIG. 4 presents a flow chart illustrating the process of providing auto-focus for a search field in a user interface in accordance with an embodiment of the present invention.

FIG. 4 presents a flow chart illustrating the process of providing auto-focus for a search field 202 in a user interface. First, the system receives a key press event on the web browser body (step 400). For instance, the system determines that the user 111 has pressed a key on an input device that should trigger an action in a web browser 114 application on a computer. Next, the system determines whether the search field 202 (or, optionally, another input field in the user interface) already has the focus (step 402) and hence will receive the user input. For instance, the computer may track the focus of the user interface across previous user and system actions, and maintain information regarding the current focus for the user interface. If the current focus indicates that the user input is already directed to the search field 202 (or another input field), the process finishes. If not, the system determines whether the key press event indicates the start of a query (step 404, described in more detail below). If the key press event does not indicate the start of a query, the process finishes. On the other hand, if the key press event indicates the start of a query, the system proceeds to set the focus on the search field 202 (step 406) and to deliver the key press event to the search field 202 (step 410). Note that delivering the key press event to the search field 202 could result in inserting a character related to the key press into the search field 202 as well as invoking other actions.

In one embodiment of the present invention, the system may optionally clear out some or all of the existing contents of the search field 202 (step 408) before delivering the key press event. Other alternative behaviors could include appending new user input (based on the key press event) to an existing set of search terms.

In one embodiment of the present invention, the focus of the user interface and the key press event can be automatically directed to an input field in a web page. Note that the specification for the web page may identify an input field that will receive focus during an auto-focus operation. The specification for the web page may also define a set of key press events and/or actions that trigger the auto-focus operation. Hence, the auto-focus behavior can be specified by the author of a web page. In a further embodiment, the focus of the user interface and the key press event may also be automatically directed to a field in a web browser 114 (e.g. a field in a toolbar or other portion of the web browser that is web-page independent) or another application. Also, if search results 204 are opened in a new web browser window and/or web browser "tab," an auto-focus operation could include shifting the focus back to the search field 202 in the original web browser window and/or web browser tab.

In one embodiment of the present invention, determining whether a key press indicates the start of a query involves identifying a subset of characters that are likely to be involved in a query. Alternatively, this determination may also involve identifying a subset of characters that are not likely to be involved in a query. For instance, the subset of characters that are likely to be involved in a query may include: alphabetic characters (e.g. 'a-z' and 'A-Z'); numeric characters (e.g. '0-9'); and/or punctuation characters (e.g. "'", "'", '(', and ')'). The subset of characters that likely to not be involved in a query may include: command shortcuts; the control key; the shift key; and navigational keys such as "page up," "page down," the space bar, the backspace key, and the arrow keys. Note that the keys likely to be involved in a query are typically not used when the user interface has page-level focus. Hence, using such keys as indicators for automatically focusing on the search field 202 does not adversely affect other existing functionality.

Note that the keys not associated with a query can be used to trigger some other action, or to perform an automatic un-focus operation for the search field 202. For instance, an arrow key may trigger the system to un-focus from the search field 202, and instead change to page-level focus and initiate a navigational operation.

In one embodiment of the present invention, the system tracks focus changes and/or the keys pressed during system operation to determine the subset of key press events likely and/or unlikely to result in focus changes. The system can gather information from these operations to determine the subset of characters that may or may not trigger an auto-focus operation. In a further embodiment, the system can also track auto-focus operations. For instance, the system may determine whether, during operation, a user typically changes the focus of the user interface using explicit user-initiated actions (such as a mouse click) or by using an auto-focus operation. By gathering statistics on such operations, the system can gather information on feature usage, which may in turn lead to other actions (e.g., providing a hint or tool tip to a user describing the availability of the auto-focus feature). Note that by tracking the user actions that occur before and/or after an auto-focus operation, the system may also determine whether a user is accidentally triggering an auto-focus operation. In a further embodiment, the system can allow a user to enable and/or disable the auto-focus capability.

In one embodiment of the present invention, the system uses a conservative estimate of the keys involved in a query to determine whether to auto-focus on the search field 202. For instance, the system can use an adaptive filter that allows some user interface events to go to the search field 202 and other user interface events to go elsewhere.

Figure 2C:
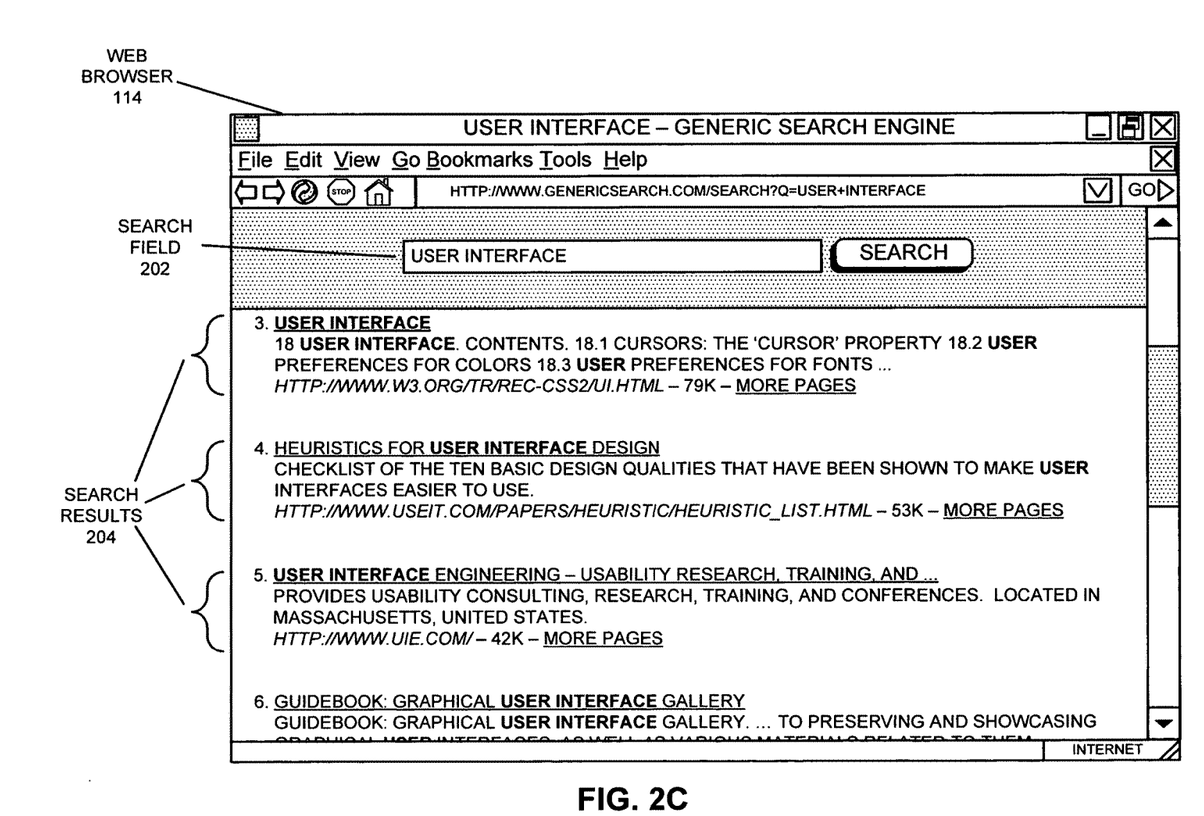
FIG. 2C illustrates a scrolled web page that displays a search field and search results in accordance with an embodiment of the present invention.

Note that if a user 111 has scrolled down the list of search results 204 (as shown in FIG. 2B), the search field 202 may no longer be visible. In one embodiment of the present invention, the system ensures that the search field 202 is always visible at the top of the page. FIG. 2C illustrates a scrolled web page and a search field 202 that is always visible at the top of the scrolled web page. Alternatively, the system can make the search field 202 appear when the system determines a key press directed towards the search field 202. In the latter configuration, the system can also be configured to scroll the view of the user interface to include the search field 202 when the system detects the search-field-related key press.

In one embodiment of the present invention, the search field 202 is the only input field in the user interface. Alternatively, the search field 202 may be one of many input fields, but is identified as the primary input field. Note that the described techniques are not limited to search fields and/or web pages, but can be applied to any user interface with a single and/or primary input field to which a user 111 might wish to return to and/or input data into.

In one embodiment of the present invention, if the user interface includes one or more input fields, the system only auto-focuses to the primary input field when the user interface currently has page-level focus. For instance, if the primary input field already has focus, or if a secondary input field has focus, the system may avoid changing the focus when that operation would steal the focus from a currently-focused input field.

In summary, in one embodiment of the present invention, the system reduces the number of user actions needed to modify a query by automatically directing user input related to a query to a search field. The system determines from characteristics of the input whether the input is directed to the search field. If so, the system automatically moves the focus of the user interface to the search field, and then directs the user input and subsequent input to the search field.

By reducing the number of user actions needed to modify a query, the system can save a user time and allows users to find desired search results more quickly. Additionally, allowing users to easily modify queries can encourage users to modify queries more frequently than in existing query systems. Hence, auto-focus can improve the quality of user queries and allow users to quickly explore the search results from multiple query variations.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method comprising:
    receiving an indication that an input has been input when a focus of a search results page that includes (i) a search field, and (ii) one or more search results, is set so that input is not directed to the search field;
    determining that (i) the input includes one or more characters of a particular subset of alphanumeric characters and (ii) the focus of the search results page is set so that input is not directed to the search field;
    in response to determining that (i) the input includes one or more characters of the particular subset of alphanumeric characters and (ii) the focus of the search results page is set so that input is not directed to the search field, setting the focus to direct the input that includes the one or more characters of the particular subset of alphanumeric characters into the search field; and
    adding the input that includes the one or more characters of the particular subset of alphanumeric characters into the search field.

2. The method of claim 1, wherein the search results page includes two or more input fields, the search field being one of the input fields, wherein the search field is a primary input field of the search results page, the primary input field indicating which of the two or more input fields receives focus based on the classifying.

3. The method of claim 1, wherein adding the input that includes the one or more characters of the particular subset of alphanumeric characters into the search field comprises appending one or more characters associated with the input to a string already present in the search field.

4. The method of claim 1, wherein adding the input that includes the one or more characters of the particular subset of alphanumeric characters into the search field comprises:
removing one or more characters from a string already present in the search field; and
appending one or more characters associated with the input to the end of the string already present in the search field.

5. The method of claim 1, further comprising:
in response to determining that (i) the input includes one or more characters of the particular subset of alphanumeric characters and (ii) the focus of the search results page is set so that input is not directed to the search field, determining whether the search field is included in a displayed portion of the search results page; and
based on determining that the search field is not included in the displayed portion of the search results page, causing the search field to be presented in the displayed portion of the search results page.

6. A non-transitory computer-readable storage medium storing software comprising instructions executable by one or more computers which, upon such execution, cause the one or more computers to perform operations comprising:
receiving an indication that an input has been input when a focus of a search results page that includes (i) a search field, and (ii) one or more search results, is set so that input is not directed to the search field;
determining that (i) the input includes one or more characters of a particular subset of alphanumeric characters and (ii) the focus of the search results page is set so that input is not directed to the search field;
in response to determining that (i) the input includes one or more characters of the particular subset of alphanumeric characters and (ii) the focus of the search results page is set so that input is not directed to the search field, setting the focus to direct the input that includes the one or more characters of the particular subset of alphanumeric characters into the search field; and
adding the input that includes the one or more characters of the particular subset of alphanumeric characters into the search field.

7. The non-transitory computer-readable storage medium of claim 6, wherein the search results page includes two or more input fields, the search field being one of the input fields, wherein the search field is a primary input field of the search results page, the primary input field indicating which of the two or more input fields receives focus based on the classifying.

8. The non-transitory computer-readable storage medium of claim 6, wherein adding the input that includes the one or more characters of the particular subset of alphanumeric characters into the search field comprises appending one or more characters associated with the input to a string already present in the search field.

9. The non-transitory computer-readable storage medium of claim 6, wherein adding the input that includes the one or more characters of the particular subset of alphanumeric characters into the search field comprises:
removing one or more characters from a string already present in the search field; and
appending one or more characters associated with the input to the end of the string already present in the search field.

10. The non-transitory computer-readable storage medium of claim 6, further comprising:
in response to determining that (i) the input includes one or more characters of the particular subset of alphanumeric characters and (ii) the focus of the search results page is set so that input is not directed to the search field, determining whether the search field is included in a displayed portion of the search results page; and
based on determining that the search field is not included in the displayed portion of the search results page, causing the search field to be presented in the displayed portion of the search results page.

11. A system comprising:
one or more computers and one or more storage devices storing instructions that are operable, when executed by the one or more computers, to cause the one or more computers to perform operations comprising:
receiving an indication that an input has been input when a focus of a search results page that includes (i) a search field, and (ii) one or more search results, is set so that input is not directed to the search field;
determining that (i) the input includes one or more characters of a particular subset of alphanumeric characters and (ii) the focus of the search results page is set so that input is not directed to the search field;
in response to determining that (i) the input includes one or more characters of the particular subset of alphanumeric characters and (ii) the focus of the search results page is set so that input is not directed to the search field, setting the focus to direct the input that includes the one or more characters of the particular subset of alphanumeric characters into the search field; and
adding the input that includes the one or more characters of the particular subset of alphanumeric characters into the search field.

12. The system of claim 11, wherein the search results page includes two or more input fields, the search field being one of the input fields, wherein the search field is a primary input field of the search results page, the primary input field indicating which of the two or more input fields receives focus based on the classifying.

13. The system of claim 11, wherein adding the input that includes the one or more characters of the particular subset of alphanumeric characters into the search field comprises appending one or more characters associated with the input to a string already present in the search field.

14. The system of claim 11, wherein adding the input that includes the one or more characters of the particular subset of alphanumeric characters into the search field comprises:
removing one or more characters from a string already present in the search field; and
appending one or more characters associated with the input to the end of the string already present in the search field.

15. The system of claim 11, further comprising:
in response to determining that (i) the input includes one or more characters of the particular subset of alphanumeric characters and (ii) the focus of the search results page is set so that input is not directed to the search field, determining whether the search field is included in a displayed portion of the search results page; and
based on determining that the search field is not included in the displayed portion of the search results page, causing the search field to be presented in the displayed portion of the search results page.

16. The method of claim 1, wherein the focus specifies where in a user interface user input is to be directed.

17. The method of claim 1, comprising:
   determining the particular subset of alphanumeric characters from instructions encoded in the search results page.

18. The method of claim 1, wherein adding the input that includes the one or more characters of the particular subset of alphanumeric characters into the search field is in response to determining that (i) the input includes one or more characters of the particular subset of alphanumeric characters and (ii) the focus of the search results page is set so that input is not directed to the search field.

\* \* \* \* \*

UNITED STATES PATENT AND TRADEMARK OFFICE
CERTIFICATE OF CORRECTION

PATENT NO. : 9,703,889 B2  Page 1 of 1
APPLICATION NO. : 11/706104
DATED : July 11, 2017
INVENTOR(S) : Michael C. Bostock It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 183 days.

Signed and Sealed this
Twenty-fifth Day of September, 2018

Andrei Iancu
*Director of the United States Patent and Trademark Office*